March 4, 1952  C. J. SMITH ET AL  2,588,171
ENGINE MOUNT
Filed Nov. 29, 1946
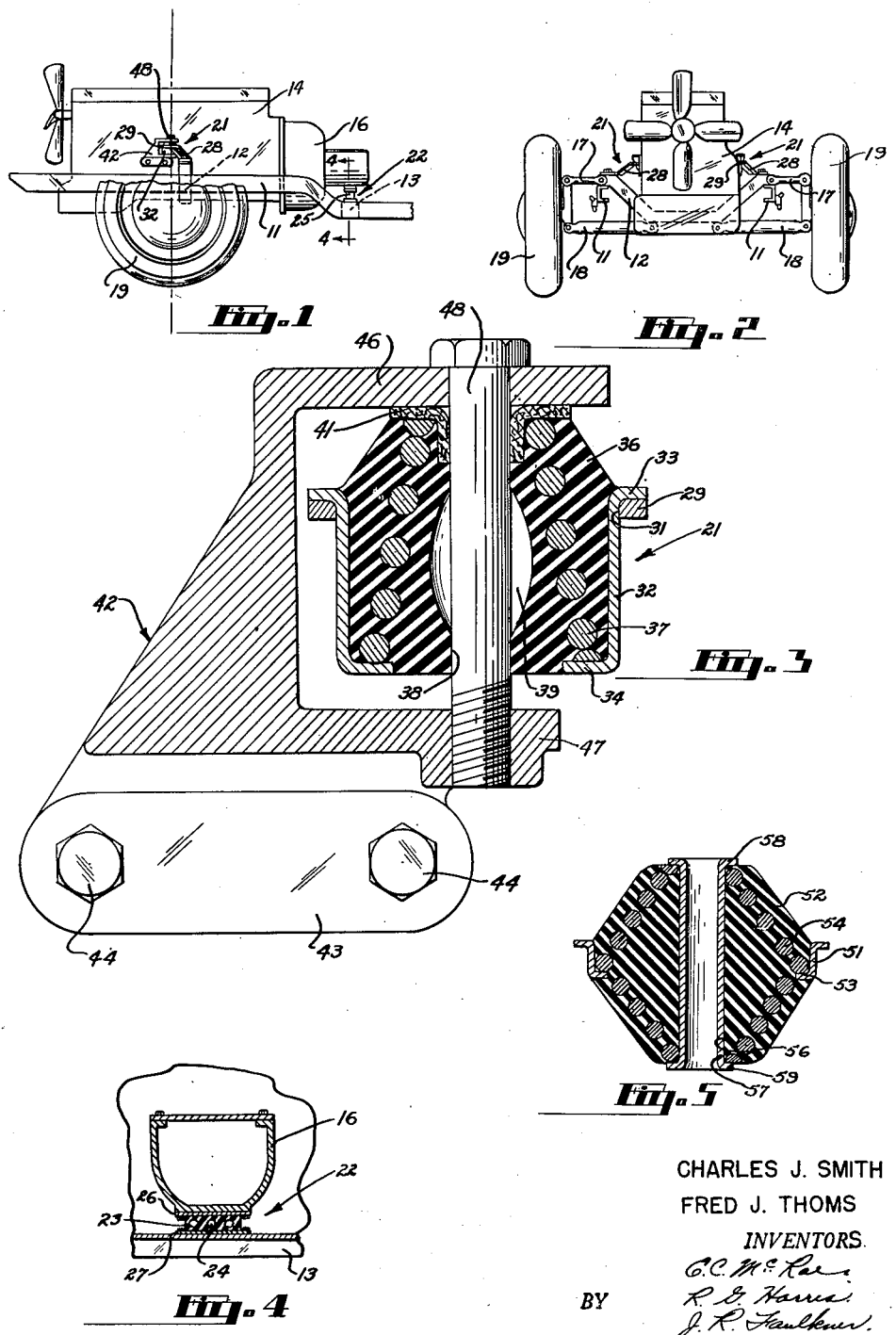
CHARLES J. SMITH
FRED J. THOMS
INVENTORS.
ATTORNEYS.

Patented Mar. 4, 1952

2,588,171

UNITED STATES PATENT OFFICE 2,588,171

ENGINE MOUNT

Charles J. Smith and Fred J. Thoms, Dearborn, Mich., assignors to Ford Motor Company, Dearborn, Mich., a corporation of Delaware Application November 29, 1946, Serial No. 712,746

1 Claim. (Cl. 248—8)

This invention relates generally to engine mounts, and has particular reference to engine mounts for internal-combustion engines for motor vehicles.

An object of the invention is to provide an engine mount for resiliently mounting an internal-combustion engine upon a motor vehicle frame and which will accommodate and permit a considerable amount of relative movement between the engine and the frame, but yet which will provide the necessary stability to control the engine movement. Although relatively soft rubber may be used in engine mounts to provide the necessary yieldability, it has been found in many cases that if the rubber is made sufficiently soft to provide the resiliency desired, the engine mount will not stand up during extended use. This disadvantage has been overcome by the present invention, in which coil springs are embedded in rubber blocks to form engine mounts having the desired characteristics so far as resiliency is concerned and also possessing long life and durability by reason of the distribution of stress between the rubber and the springs.

Another object of the invention is the provision of an engine mount and supporting means for arranging the engine mount between engine and frame parts such that the principal oscillation at the mount occurs in a vertical direction while the oscillation in other directions is controlled within necessary limits for stable operation.

Other objects and advantages of this invention will be made more apparent as this description proceeds, particularly when considered in connection with the accompanying drawings, in which:

Figure 1 is a fragmentary side elevational view of an internal-combustion engine supported upon a motor vehicle frame by means of the engine mounts of the present invention.

Figure 2 is a front elevational view of the construction shown in Figure 1.

Figure 3 is an enlarged longitudinal cross sectional view through one of the engine mounts and the associated brackets.

Figure 4 is a transverse cross sectional view taken substantially on the plane indicated by the line 4—4 of Figure 1, showing the rear steady rest.

Figure 5 is a cross sectional view through a modified engine mount.

Referring now to the drawings, and particularly to Figures 1 and 2, there is shown a motor vehicle having a frame consisting of side frame members 11, and transverse cross frame members 12 and 13. An internal-combustion engine, shown diagrammatically, is indicated generally by the reference character 14, and carries a transmission housing 16 at its rearward end. Upper and lower suspension links 17 and 18 independently suspend the front road wheels 19 upon the transverse front cross frame member 12.

In the present instance, the engine 14 is resiliently supported upon the vehicle frame by a pair of side motor mount assemblies 21 and a single rear steady rest assembly 22. Although shown in amounting system in which they are particularly advantageous, the individual engine mounts can also be used to advantage in other locations and with other types of engine mounting arrangements as well. In the drawings, it will be noted that the side engine mount assemblies 21 are disposed on opposite sides of the engine 14 in transverse alignment with each other and also in transverse alignment with the center of gravity of the entire engine assembly including the transmission, clutch, generator, starting motor, and other auxiliary equipment normally associated with an engine. While theoretically an engine mounted exactly at the point representing the center of gravity of the engine would be the most desirable mounting in so far as insulating the vehicle frame from the vibrations and oscillations of the engine resulting from torque impulses and the like, this is of course physically impossible. The result can, however, be approximated by the arrangement shown in which two mountings are provided, one on each side of the engine, in transverse alignment with the center of gravity. In this connection it should be noted that the rear steady rest assembly 22 is not for the purpose of providing another mounting point for the engine, as in the case of the conventional type of three-point mounting, but is merely for the purpose of providing insurance against possible excessive oscillation of the rear end of the engine without materially interfering with its normal oscillation about the side engine mounts. For this purpose, the rear steady rest assembly comprises a block of relatively soft rubber 23, which is formed with a plurality of holes 24 therethrough to increase its resiliency. The soft rubber block 23 is suitably bonded to upper and lower plates 26 and 27 bolted respectively to the transmission housing 16 and the transverse cross frame member 13.

The side engine mount assemblies 21 are identical in construction, except for being reversed, and consequently only one will be described in detail. A supporting bracket 28 is bolted to the upper portion of the transverse front cross frame member 12 and extends inwardly therefrom terminating in a substantially horizontal flange 29, which is provided with a circular opening 31. A cup-shaped housing 32 is mounted within the opening 31 and is provided with an outwardly extending upper flange 33 resting upon the horizontal flange 29 of the supporting bracket 28. The cup-shaped housing also has an inwardly extending lower flange 34. Bonded or vulcanized within the cup-shaped housing 32 is a rubber block 36 of relatively soft rubber.

During the molding of the rubber block 36, a coil spring 37 is embedded therein. The coil spring 37 is in the form of a volute spring with its lower convolutions having the greatest diameter and resting upon the inwardly turned lower flange 34 of the housing. Extending vertically through the rubber block 36 is a bore 38 which is enlarged intermediate its ends to form a cavity 39. Adjacent its upper end the rubber block 36 is recessed to receive a fiber insert 41 serving as an insulator to prevent metal-to-metal contact between parts of the assembly, as will be seen hereinafter.

It will be apparent from the preceding description that the combined rubber block and coil spring engine mount is supported upon the vehicle frame by means of the bracket 28. The mount is, in turn, adapted to support the engine 14 by means of a bracket 42 which has a lower supporting flange 43 secured to the engine block by means of bolts 44. The body of the bracket 42, which may be a casting, is formed with a pair of vertically spaced horizontally extending flanges 46 and 47 with the upper flange 46 resting upon the fiber insert 41 of the engine mount. A headed bolt 48 extends through the upper flange 46 of the bracket 42 and is threadedly received at its lower end in the flange 47 of the bracket. The diameter of the bolt 48 corresponds with the diameter of the bore 38 formed in the rubber block 36 and extends therethrough. Intermediate its ends, the bolt 48 is of course spaced from the rubber block 36 by the cavity 39 formed therein.

In an engine mounting arrangement of the type shown, and in other types as well, the engine mounts must provide a considerabl amount of resiliency to accommodate relative movement between the engine and the frame during oscillation and vibration of the engine. It is difficult to obtain a simple rubber mounting which provides the necessary softness yet which will stand up during long periods of service without failure. This trouble is eliminated by the present engine mount, since the rubber block 36 and the coil spring 37 function together to provide the requisite resiliency and flexibility and form a durable engine mount having a long life. Inasmuch as the various loads and stresses are not carried wholly by the rubber block, but are distributed between the rubber block and the coil spring, the stress to which each is subjected is materially less than in the normal type of engine mount.

Although the major portion of the oscillatory motion takes place in a generally vertical direction, limited resiliency in transverse directions is afforded and is enhanced by the cavity 39 in the rubber block which provides clearance for such distortion of the rubber as may take place during such movement. It will further be noted that the fiber insert 41 completely insulates the metal coil spring 37 from the upper flange 46 of the engine bracket 42, and thus prevents metal-to-metal contact, resulting in a noiseless mounting.

It will be noted from an examination of Figure 1 that the side engine mount assemblies 21, in addition to being in alignment with the center of gravity, are also in vertical alignment with the axis joining the two front wheels 19, so that the weight of the engine is supported directly above the front wheels.

Reference is now made to a modified structure shown in Figure 5, in which for the sake of simplicity the engine bracket and the vertical bolt carried thereby have been omitted. In this modification, the cup-shaped housing 51 is relatively narrow in vertical extent and is molded or vulcanized to the rubber block 52 adjacent an intermediate zone of the latter. The lower flange 53 of the housing extends into the rubber block and forms a support for an intermediate convolution of the coil spring 54 which is molded into the rubber block. It will be noted that both the coil spring 54 and the rubber block 52 decrease in radial dimension both above and below the cup-shaped housing 51. An aperture 56 is formed vertically through the rubber block and contains a sleeve 57 adapted to receive a bolt carried by the engine bracket (not shown). Retaining flanges 58 and 59 are formed at opposite ends of the sleeve 57. In this engine mount, the coil spring 54 co-operates with the rubber block 52 in resiliently supporting the engine upon the frame.

It will be understood that the invention is not to be limited to the exact construction shown and described, but that various changes and modifications may be made without departing from the spirit and scope of the invention, as defined in the appended claim.

What is claimed is:

An engine mount for resiliently mounting an internal combustion engine upon a motor vehicle frame, comprising, in combination, supporting means carried by said frame, a rubber block mounted upon said supporting means and having an aperture extending vertically therethrough, a coil spring embedded in said rubber block and engageable with said supporting means to transmit load directly thereto, supporting means carried by said engine and arranged to transmit a portion of the weight of said engine to said rubber block and said coil spring, and a rod mounted vertically in said last-mentioned supporting means and extending through said aperture in said rubber block, said aperture corresponding in diameter to the diameter of said rod adjacent the upper and lower portions of said rubber block and said aperture being enlarged intermediate its ends to provide clearance between said rod and said rubber block.

CHARLES J. SMITH.
FRED J. THOMS.

REFERENCES CITED

The following references are of record in the file of this patent:

UNITED STATES PATENTS

| Number | Name | Date |
|---|---|---|
| 1,497,152 | Masury et al. | June 10, 1924 |
| 2,038,968 | Summers | Apr. 28, 1936 |
| 2,196,428 | Saurer | Apr. 9, 1940 |
| 2,439,739 | Hussman | Apr. 13, 1948 |